US012619269B2

(12) United States Patent
Juna et al.

(10) Patent No.: US 12,619,269 B2
(45) Date of Patent: May 5, 2026

(54) INTEGRATED CIRCUIT TEMPERATURE SENSOR WITH A REFERENCE VOLTAGE SOURCE PIN

(71) Applicant: Microchip Touch Solutions Limited, Wokingham (GB)

(72) Inventors: Ashfaq Alan Juna, Winnersh (GB); Ezana Haile, Cedar Park, TX (US)

(73) Assignee: Microchip Touch Solutions Limited, Wokingham (GB)

( * ) Notice: Subject to any disclaimer, the term of this patent is extended or adjusted under 35 U.S.C. 154(b) by 172 days.

(21) Appl. No.: 18/600,874

(22) Filed: Mar. 11, 2024

(65) Prior Publication Data

US 2025/0216875 A1     Jul. 3, 2025

Related U.S. Application Data

(60) Provisional application No. 63/615,101, filed on Dec. 27, 2023.

(51) Int. Cl.
| | |
|---|---|
| *G05F 1/567* | (2006.01) |
| *G01K 7/16* | (2006.01) |
| *G05F 1/46* | (2006.01) |

(52) U.S. Cl.
CPC .............. *G05F 1/567* (2013.01); *G01K 7/16* (2013.01); *G05F 1/461* (2013.01); *G05F 1/463* (2013.01); *G05F 1/468* (2013.01)

(58) Field of Classification Search
CPC .......... G05F 1/461; G05F 1/463; G05F 1/468; G05F 1/567; G01K 7/01
See application file for complete search history.

(56) References Cited

U.S. PATENT DOCUMENTS

| | | | |
|---|---|---|---|
| 2008/0031304 A1 | 2/2008 | Nishimura | .................... 374/178 |
| 2014/0241398 A1 | 8/2014 | Snowdon et al. | ........... 374/183 |
| 2017/0257113 A1* | 9/2017 | Singh | ....................... G01K 7/01 |
| 2023/0395257 A1* | 12/2023 | Karimi | .................. G16H 20/10 |

FOREIGN PATENT DOCUMENTS

JP     H09229778 A  *  9/1997

OTHER PUBLICATIONS

Texas Instruments, "TMS320F2803x Real Time Microcontrollers," 168 pages, Jun. 2021.
Microchip Technology Incorporated, "MCP970X: Low-Power Linear Active Thermistor ICs," 26 pages, Sep. 14, 2021.
International Search Report and Written Opinion, Application No. PCT/EP2024/068212, 10 pages, Oct. 4, 2024.

* cited by examiner

*Primary Examiner* — Jue Zhang
(74) *Attorney, Agent, or Firm* — SLAYDEN GRUBERT BEARD PLLC

(57) ABSTRACT

A system, apparatus, and method for an integrated circuit (IC) temperature sensor having a reference voltage source pin is disclosed. The apparatus includes an integrated circuit temperature sensor including a sensing circuit; a reference voltage source to output a reference voltage; an operational amplifier coupled to the sensing circuit and the reference voltage source; an output voltage pin coupled to an output of the operational amplifier, the output voltage reflecting a difference between a voltage of the sensing circuit and the reference voltage; and a reference voltage source pin coupled to the reference voltage source.

20 Claims, 3 Drawing Sheets

INTEGRATED CIRCUIT TEMPERATURE SENSOR WITH A REFERENCE VOLTAGE SOURCE PIN

PRIORITY

This application claims priority to U.S. Provisional Patent Application No. 63/615,101, filed Dec. 27, 2023, the contents of which are hereby incorporated in their entirety.

TECHNICAL FIELD

The present disclosure relates to temperature sensors, in particular, to an integrated circuit temperature sensor having a reference voltage source pin.

BACKGROUND

An integrated circuit (IC) temperature sensor may be built as a stand-alone semiconductor device or package in order to more easily deploy temperature sensors in a larger system, such as a circuit board, server, mobile phone, tablet, or other suitable electronic device or system. IC temperature sensors generate a reference voltage on the IC that corresponds to 0° Celsius. By measuring the output voltage of the IC temperature sensor and accounting for the reference voltage, the ambient temperature can be calculated. However, generation of the reference voltage is prone to errors caused by component tolerances and manufacturing defects. While manufacturing tolerances may be improved, doing so may result in increased manufacturing cost.

Thus, there is a need for a temperature sensor to achieve higher accuracy without increasing manufacturing cost.

SUMMARY OF THE INVENTION

Aspects provide systems and methods for integrated circuit (IC) temperature sensor having a reference voltage source pin. An apparatus includes an integrated circuit temperature sensor including a sensing circuit; a reference voltage source to output a reference voltage; an operational amplifier coupled to the sensing circuit and the reference voltage source; an output voltage pin coupled to an output of the operational amplifier, the output voltage reflecting a difference between a voltage of the sensing circuit and the reference voltage; and a reference voltage source pin coupled to the reference voltage source.

A method includes measuring a reference voltage at a reference voltage pin of an integrated circuit temperature sensor; measuring an output voltage at an output voltage pin of the integrated circuit temperature sensor; determining a difference between the output voltage and the reference voltage; and determining a temperature based on the difference between the output voltage and the reference voltage.

A system includes an integrated circuit temperature sensor including a sensing circuit; a reference voltage source to output a reference voltage; an operational amplifier to output a voltage at an output voltage pin, the output voltage reflecting a difference between a voltage of the sensing circuit and the reference voltage; a reference voltage source pin coupled to the reference voltage source; and a control circuit to: measure a reference voltage at a reference voltage pin of an integrated circuit temperature sensor; measure an output voltage at an output voltage pin of the integrated circuit temperature sensor; determine a difference between the output voltage and the reference voltage; and determine a temperature based on the difference between the output voltage and the reference voltage.

BRIEF DESCRIPTION OF THE DRAWINGS

The figures illustrate examples of systems and methods.

The reference number for any illustrated element that appears in multiple different figures has the same meaning across the multiple figures, and the mention or discussion herein of any illustrated element in the context of any particular figure also applies to each other figure, if any, in which that same illustrated element is shown.

DESCRIPTION

According to an aspect of the invention, an integrated circuit (IC) temperature sensor having a reference voltage source pin is provided. The IC temperature sensor includes pins to allow for measurement of the reference voltage ($V_{ref}$) and voltage output ($V_{out}$). By measuring both voltages, a voltage differential may be calculated and result in a more accurate temperature reading without requiring calibration of the IC temperature sensor. The term pin, as used herein, is not meant to be limited to any particular type of physical structure, and may include, without limitation, gull-wing or J-lead terminals, solder balls, or lands.

Figure 1:
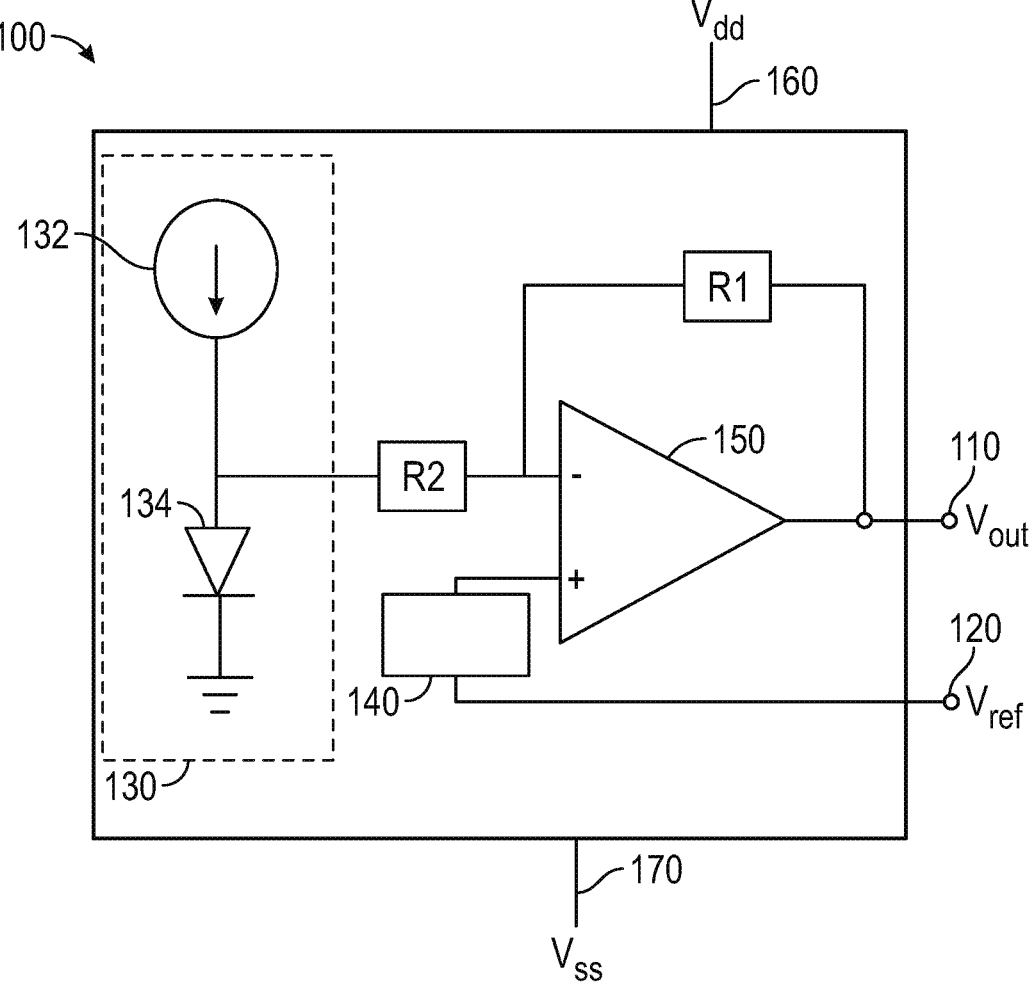
FIG. 1 illustrates an IC temperature sensor, according to examples of the present disclosure.

FIG. 1 illustrates an IC temperature sensor, according to examples of the present disclosure. IC temperature sensor 100 may include $V_{out}$ pin 110, $V_{ref}$ pin 120, sensing circuit 130, reference voltage source 140, operational amplifier 150, $V_{dd}$ pin 160, $V_{ss}$ pin 170, first resistor R1, and second resistor R2. Sensing circuit 130 may generate a voltage or current proportional to a temperature within a defined operational range. Sensing circuit 130 may yield an output similar to, for example, a diode, transistor, transducer, thermocouple, thermistor, or resistance thermometer. For example, sensing circuit 130 may be formed of constant current source 132 and diode 134. With a constant current applied by constant current source 132, the voltage across diode 134 will change by approximately 1 to 2 mV/° C.

Reference voltage source 140 may produce a constant voltage. Operational amplifier 150 may receive the output of sensing circuit 130, a voltage generated across diode 134, and the reference voltage from reference voltage source 140 and may provide an output voltage to $V_{out}$ pin 110, which output voltage to $V_{out}$ pin 110 reflecting a difference between a voltage of the sensing circuit and the reference voltage. The output voltage may be proportional to the measured temperature of the environment around IC temperature sensor 100. The gain of operational amplifier 150 may be controlled by the respective values of first resistor R1 and second resistor R2. The term "environment" as used herein is meant to include the temperature of the silicon of diode 134, which may be influenced by the temperature of adjacent silicon, a silicon substrate, and other environmental conditions.

$V_{ref}$ pin 120 may enable a circuit in receipt of the output voltage from $V_{out}$ pin 110 to determine the temperature of sensing circuit 130 irrespective of any changes to the amount of the reference voltage, such as any changes to the reference voltage as a result of changes in temperature. Additionally, the reference voltage may be used elsewhere in the larger system of which IC temperature sensor 100 is a part, providing a stable reference for other components to access. $V_{dd}$ pin 160 may enable input from a power supply IC temperature sensor 100 and $V_{ss}$ pin 170 may be a ground pin for IC temperature sensor 100.

Figure 3:
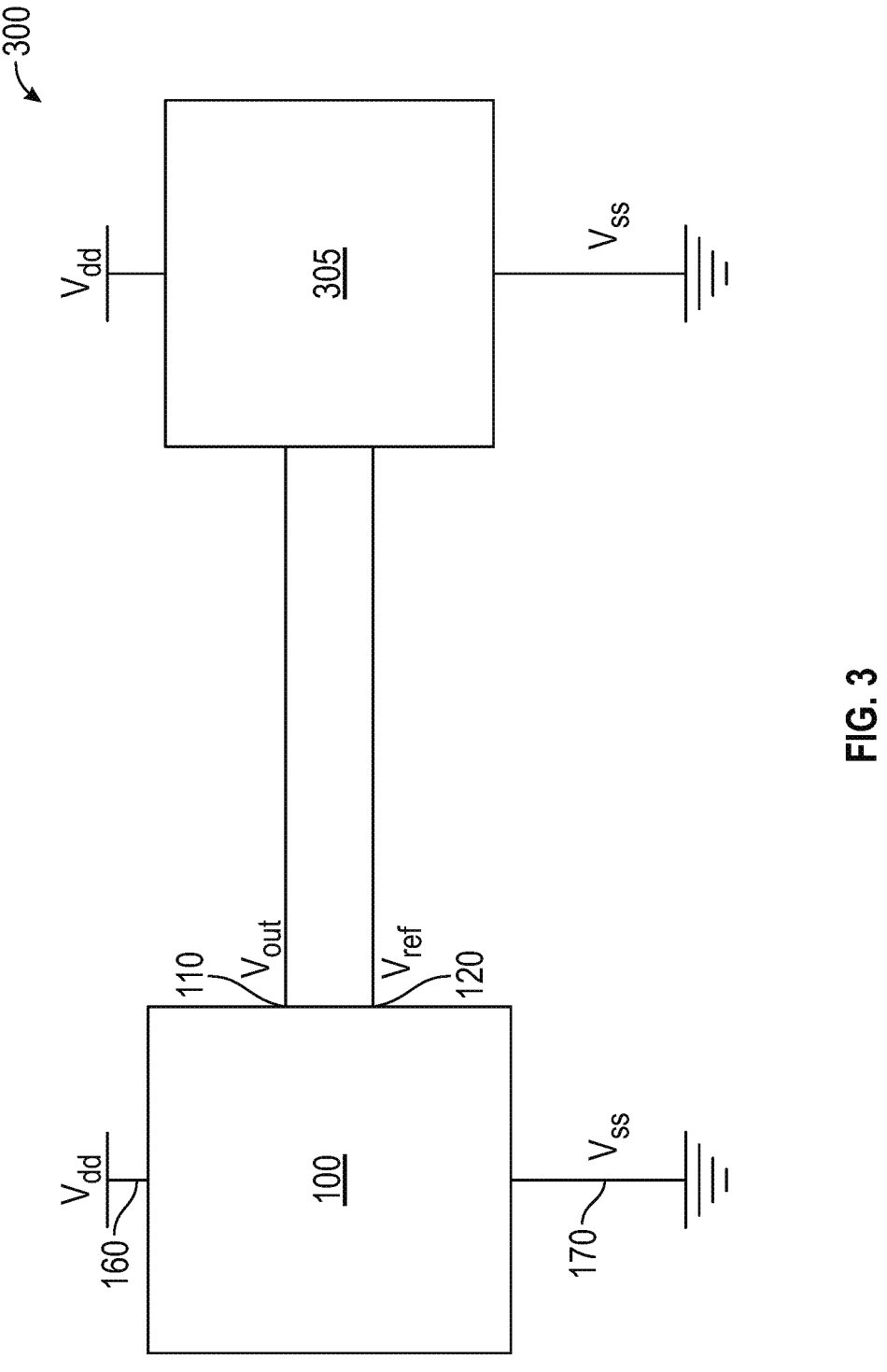
FIG. 3 illustrates a system including an IC temperature sensor and a control circuit, according to examples of the present disclosure.

After measuring the output and reference voltages, a user or other portion of the system, such as control circuit 305 shown in FIG. 3, may calculate the difference between the output voltage and the reference voltage and may convert to a temperature reading. For example, the temperature (in degrees Celsius) may be calculated using the formula:

$$Temp\,(C) = \frac{(V_{out} - V_{ref})}{T_c} \qquad (1)$$

where $T_c$ is the temperature coefficient of IC temperature sensor 100.

By providing for measurement of the reference voltage, without assuming that the generated reference voltage $V_{ref}$ is a constant predetermined value, any variations in the reference voltage over time can be removed from the temperature determination. Additionally, any errors in the reference voltage provided by reference voltage source 140 that may be introduced by software or manufacturing defects are mitigated by measuring the provided reference voltage. Further, IC temperature sensor 100 may have improved noise immunity because any noise in the output voltage will be offset by the same noise signature in the reference voltage from reference voltage source 140.

The output voltage, the reference voltage, and/or the difference between the two may be provided to a measurement tool, such as a voltmeter, a panel meter, or a digital multimeter, to visually display temperature readings without using any programming or complicated conversion circuitry. For example, when the temperature coefficient ($T_c$) is 10 millivolts per degree Celsius (mV/C), a measurement tool may display 199.9 mV. A user of the measurement tool can determine that the temperature is 19.99° C. because the calculation is a simple translation of the decimal one place.

Figure 2:
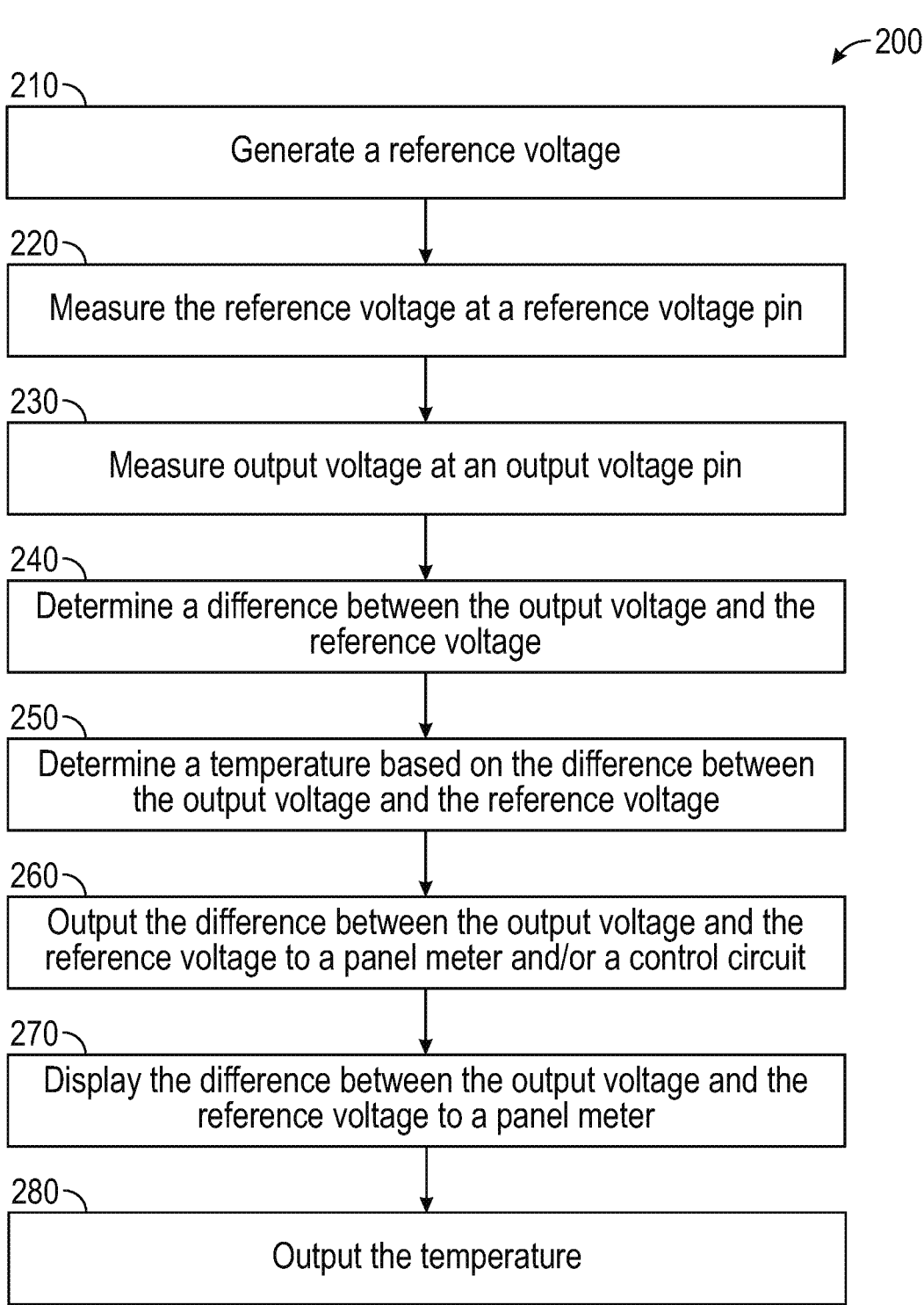
FIG. 2 illustrates a method performed to determine a temperature using an IC temperature sensor, according to examples of the present disclosure.

FIG. 2 illustrates a method performed to determine a temperature using an IC temperature sensor, according to examples of the present disclosure. Method 200 may be implemented using an IC temperature sensor, such as IC temperature sensor 100 shown in FIG. 1, in combination with a processor, such as control circuit 305 shown in FIG. 3, or any other system operable to implement method 200. Although examples have been described above, other variations and examples may be made from this disclosure without departing from the spirit and scope of these disclosed examples.

Method 200 begins at block 210 where method 200 may generate a reference voltage. For example, method 200 may instruct a reference voltage source to generate the reference voltage, such as reference voltage source 140 shown in FIG. 1. The reference voltage may provide a voltage against which the output voltage from an IC temperature sensor may be compared to calculate a temperature, as explained at block 250.

At block 220, method 200 may measure the reference voltage at a reference voltage pin, such as $V_{ref}$ pin 120 shown in FIG. 1. The voltage may be measured using a measurement tool, such as a voltmeter, a panel meter, a digital multimeter, or by an analog to digital (A/D) converter.

At block 230, method 200 may measure the output voltage at an output voltage pin, such as $V_{out}$ pin 110 shown in FIG. 1. The voltage may be measured using a measurement tool, such as a voltmeter, a panel meter, a digital multimeter, or by an analog to digital (A/D) converter. The same A/D converter may be used in both blocks 220 and 230, in conjunction with an analog multiplexer, or separate A/D converters may be utilized.

At block 240, method 200 may determine the difference between the output voltage and the reference voltage. At block 250, method 200 may use the difference calculated at block 240 to determine a temperature. For example, the temperature (in degrees Celsius) may be calculated using the formula:

$$Temp\,(C) = \frac{(V_{out} - V_{ref})}{T_c}$$

where $T_c$ is the temperature coefficient of the IC temperature sensor.

At block 260, method 200 may output the difference between the output voltage and the reference voltage to any suitable measurement tool, such as a voltmeter, a panel meter, a digital multimeter, or an analog to digital converter (ADC). Additionally, or alternatively, method 200 may output the difference between the output voltage and the reference voltage to a control circuit, such as control circuit 305 shown in FIG. 3.

At block 270, method 200 may display the difference between the output voltage and the reference voltage. This display may be on a measurement tool or any other suitable display, such as a display coupled to a control circuit performing method 200.

At block 280, method 200 may output the temperature calculated at block 250. The temperature may be displayed on a display or used elsewhere in a system containing the IC temperature sensor.

FIG. 3 illustrates a system including IC temperature sensor 100 and control circuit 305, according to examples of the present disclosure. IC temperature sensor 100 may be the same IC temperature sensor 100 shown in FIG. 1. Control circuit 305 may be implemented in any suitable combination of analog and digital circuitry, such as a suitable microprocessor, microcontroller, control board, or other computing device having input and output interfaces for communicating with other devices, as well as memory or other storage for program logic/instructions that control circuit 305 executes to send and receive signals and process data. Control circuit 305 may receive voltages (e.g., $V_{ref}$ and $V_{out}$) from IC temperature sensor 100 and analyze those voltages to determine a temperature of the environment surrounding IC temperature sensor 100. Specifically, control circuit 305 may perform method 200 shown in FIG. 2.

Although examples have been described above, other variations and examples may be made from this disclosure without departing from the spirit and scope of these disclosed examples.

The invention claimed is:

1. An apparatus, comprising:
   an integrated circuit temperature sensor package including:
      a sensing circuit;

a reference voltage source to output a reference voltage;

an operational amplifier coupled to the sensing circuit and the reference voltage source;

an output voltage pin coupled to an output of the operational amplifier, the output voltage reflecting a difference between a voltage of the sensing circuit and the reference voltage; and a reference voltage source pin coupled to the reference voltage source;

wherein the output voltage pin and the reference voltage source pin are configured to be accessible by a device external to the integrated circuit temperature sensor package.

2. The apparatus of claim 1, wherein the sensing circuit includes:

a constant current source; and a diode.

3. The apparatus of claim 1, the integrated circuit temperature sensor including a first resistor and a second resistor, wherein a gain of the operational amplifier is controlled by a resistance of the first resistor and a resistance of the second resistor.

4. The apparatus of claim 1, the integrated circuit temperature sensor including a power supply input pin.

5. The apparatus of claim 1, the integrated circuit temperature sensor including a power ground pin.

6. The apparatus of claim 1, wherein an output voltage at the output voltage pin is proportional to a temperature of an environment around the integrated circuit temperature sensor.

7. A method comprising:

measuring a reference voltage at a reference voltage pin of an integrated circuit temperature sensor package, the reference voltage pin accessible external to the integrated circuit temperature sensor package;

measuring an output voltage at an output voltage pin of the integrated circuit temperature sensor package, the output voltage pin accessible external to the integrated circuit temperature sensor package;

determining a difference between the output voltage and the reference voltage; and determining a temperature based on the difference between the output voltage and the reference voltage.

8. The method of claim 7, comprising displaying the difference between the output voltage and the reference voltage.

9. The method of claim 7, comprising outputting the temperature.

10. The method of claim 7, comprising outputting the reference voltage to a control circuit.

11. The method of claim 7, comprising outputting the difference between the output voltage and the reference voltage to a panel meter.

12. The method of claim 7, comprising outputting the reference voltage to an analog to digital converter.

13. The method of claim 7, comprising generating the reference voltage at the integrated circuit temperature sensor.

14. The method of claim 7, wherein the output voltage is proportional to a temperature of an environment around the integrated circuit temperature sensor.

15. A system, comprising:

an integrated circuit temperature sensor package including:

a sensing circuit;

a reference voltage source to output a reference voltage;

an operational amplifier to output a voltage at an output voltage pin, the output voltage reflecting a difference between a voltage of the sensing circuit and the reference voltage;

a reference voltage source pin coupled to the reference voltage source, wherein the output voltage pin and the reference voltage source pin are configured to be accessible by a device external to the integrated circuit temperature sensor package; and a control circuit to:

measure the reference voltage at the reference voltage source pin of an integrated circuit temperature sensor;

measure the output voltage at the output voltage pin of the integrated circuit temperature sensor;

determine a difference between the output voltage and the reference voltage; and determine a temperature based on the difference between the output voltage and the reference voltage.

16. The system of claim 15, the control circuit to output the difference between the output voltage and the reference voltage.

17. The system of claim 15, the control circuit to output the temperature.

18. The system of claim 15, the control circuit to output the reference voltage to an analog to digital converter.

19. The system of claim 15, the integrated circuit temperature sensor to display the difference between the output voltage and the reference voltage.

20. The system of claim 15, wherein the output voltage is proportional to a temperature of an environment around the integrated circuit temperature sensor.

* * * * *